United States Patent [19]

Branin

[11] E Re. 29,203

[45] Reissued May 3, 1977

[54] METHOD OF MAKING PHOSPHOR SCREENS

[75] Inventor: Phyllis Brown Branin, Lawrenceville, N.J.

[73] Assignee: RCA Corporation, New York, N.Y.

[22] Filed: Aug. 23, 1976

[21] Appl. No.: 716,533

Related U.S. Patent Documents

Reissue of:

[64] Patent No.: 3,313,643
Issued: Apr. 11, 1967
Appl. No.: 559,124
Filed: June 21, 1966

U.S. Applications:

[63] Continuation-in-part of Ser. No. 190,771, April 27, 1962, abandoned.

[52] U.S. Cl. ..... 427/68; 427/72; 427/181; 427/183; 427/232; 427/240

[51] Int. Cl.[2] ..... B05D 5/06; B05D 5/12

[58] Field of Search ..... 427/71, 72, 73, 240, 427/68, 181, 183, 232, 235

[56] References Cited

UNITED STATES PATENTS

| | | | |
|---|---|---|---|
| 2,739,567 | 3/1956 | Jones | 118/602 |
| 2,837,429 | 6/1958 | Whiting | 427/72 |
| 2,845,099 | 7/1958 | Bailey | 427/72 |
| 2,854,413 | 9/1958 | Geary | 427/72 |
| 2,897,089 | 7/1958 | Ahlburg | 427/72 |
| 2,930,349 | 3/1960 | Jones | 118/602 |
| 2,931,527 | 4/1960 | Lems | 118/408 |
| 2,932,570 | 4/1960 | LaBuff | 427/72 |
| 3,095,317 | 6/1963 | Saffire | 427/72 |
| 3,143,435 | 8/1964 | Martyny | 427/72 |
| 3,226,246 | 12/1965 | Vermulen | 427/72 |

*Primary Examiner*—Michael F. Esposito
*Attorney, Agent, or Firm*—E. M. Whitacre; G. H. Bruestle; L. Greenspan

[57] ABSTRACT

*Method comprises applying a portion of initial slurry to a first substrate, spreading the initial slurry on the substrate, removing the excess slurry from the substrate, preparing a reconstituted slurry comprised of the removed excess slurry and a makeup slurry, and then dispensing a portion of reconstituted slurry onto a second substrate. As compared to the initial slurry, the makeup slurry has at least one of (1) a larger proportion of large particles, (2) a larger proportion of phosphor, (3) a greater binder/water ratio and (4) a smaller photosensitizer/binder ratio.*

10 Claims, No Drawings

METHOD OF MAKING PHOSPHOR SCREENS

Matter enclosed in heavy brackets[ ]appears in the original patent but forms no part of this reissue specification; matter printed in italics indicates the additions made by reissue.

This is a continuation-in-part of my Pat. application Ser. No. 190,771, filed Apr. 27, 1962 now abandoned.

This invention relates to the making of phosphor screens for cathode ray tubes. The invention is particularly directed to the so-called slurry process used in making mosaic type screens having a plurality of different phosphors disposed in a systematically arrayed multiplicity of elemental areas, e.g., dots or lines. Such screens are used in apertured shadow mask type color cathode ray tubes.

In making phosphor screens using the slurry process, phosphor powder is mixed with a liquid, e.g., water, to form a slurry, and a quantity of the slurry is deposited onto and spread over a faceplate panel by spinning and tilting the panel. In making mosaic type screens by the so-called direct photographic process, a photoresist, (photosensitized binder) is also included in the slurry. The photoresist may, for example, comprise a polymer such as polyvinyl alcohol (PVA), polyvinyl pyrrolidone, gelatin, gum arabic, or albumin as the binder which is mixed with a photosensitizer; e.g., a dichromate such as ammonium dichromate or potassium dichromate.

After a layer of the photosensitized slurry has been spread over the faceplate panel and dried, selected areas of the phosphor-coated faceplate panel are exposed to a desired pattern of actinic light. The exposed panel is then developed by washing it to remove the unexposed areas. This process is repeated for each of a plurality of desired phosphors, such as red-emitting, green-emitting, and blue-emitting phosphors.

In making a plurality of mosaic screens on a production line basis, the preferred practice has been: (1) to fill a dispensing apparatus with an initial charge of a desired slurry formulation; (2) to dispense more than the required quantity of the slurry therefrom onto the center of a faceplate panel; (3) to spin and tilt the panel so as to spread the slurry outward from the center and over the surface thereof; (4) to salvage the excess slurry from the panel by scooping or flinging the excess from the periphery of the spinning panel; (5) to return the salvaged slurry to the dispensing apparatus and mix it with the slurry still there, and to transfer additional makeup slurry like that of the initial charge from a separate slurry reservoir to the dispensing apparatus to replenish the slurry depleted therefrom to form a reconstituted slurry; and (6) to dispense a portion of the reconstituted slurry onto another faceplate panel.

When a process as described in the preceding paragraph has been followed, an unexpected catastrophic reduction of phosphor-to-faceplate adherence has resulted. As successive faceplate panels are slurried and exposed to produce the desired phosphor patterns thereon, a gradual decrease of adherence sets in. Such reduced adherence continues to decrease with successively slurried panels and becomes so great that adequate adherence can no longer be obtained by other adjustments; such as in the exposure step. Satisfactory adherence may be restored only by completely emptying the slurry dispensing apparatus and reservoir and recharging them with a new quantity of slurry with the desired adherence. This is both time consuming, and costly.

It is an object of this invention to provide a new and improved method for making phosphor screens using a slurry process.

It is also an object of this invention to provide a new and improved method of making cathode ray tube phosphor screens by the slurry process in which excess slurry is salvaged and catastrophic-like reduction of adherence is prevented.

Another object of this invention is to provide a new and improved method of making cathode ray tube phosphor screens that is particularly adapted to mass production techniques.

My invention is predicated upon, among other things: (a) the discovery that certain characteristics of the phosphor slurry are of primary importance in obtaining good adherence of the phosphors to the faceplate panel; and (b) the further discovery that good phosphor adherence can be continuously maintained by making these certain characteristics of the makeup slurry different from those of the initial charge of slurry.

Specifically, I have discovered that for a given phosphor material, photo-exposure, and developing procedure, the following slurry characteristics are important to the obtaining of good adherence: (1) phosphor particle size distribution; (2) phosphor concentration; (3) binder concentration; and (4) photosensitizer concentration. The absolute values of these characteristics which will give optimum adherence, are therefore used in compounding the slurry with which the dispensing apparatus is initially charged or filled. However, I have also discovered that good adherence can be continuously maintained (and catastrophic-like reduction of adherence prevented) if one or more of the following changes is made in the makeup slurry as compared to the initial charge of slurry: (1) the percentage of phosphor whose particles are larger than a given particle size increased; (2) the phosphor concentration of the slurry increased; (3) the binder to water ratio of the slurry increased; (4) the photosensitizer to binder ratio of the slurry decreased.

When a phosphor slurry is spread by spinning over a faceplate panel in a screening operation, phosphor particles begin to settle out of the slurry mixture and onto the panel. This phenomenon tends to decrease the concentration of the phosphor in the salvaged excess slurry. However, the centrifugal action of the spinning, tends to move the denser particles off the panel faster than the liquid in the slurry, tending to increase the concentration of the phosphor in the excess salvaged slurry. Also, evaporation of the liquid from the relatively large surface area of the slurry spread on the panel in combination with the wetting of the surface of the panel tend to increase the concentration of the phosphor in the salvaged excess slurry. The settling of the phosphor is sometimes more pronounced for the larger phosphor particles dispensed into the panel than for the smaller particles. Thus, the excess slurry which is salvaged from the panel may have a different phosphor concentration and a different average particle size than that of the initial slurry charge. As a consequence, when this salvage slurry is returned to the dispensing apparatus and mixed with makeup slurry and the slurry still there to form the reconstituted slurry, the phosphor concentration and average phosphor particle size of the slurry there is altered unless appropriate measures are taken.

I have discovered that these variations of the phosphor concentration and phosphor particle size distribution will be sufficient to adversely affect the adherence of subsequently made screens. Therefore, according to a preferred practice of the invention, one or both of (1) the phosphor concentration and (2) the percentage of the phosphor which is constituted of large particles (larger than a given size) is made greater in the makeup slurry than in the initial charge slurry. In such case, the makeup slurry is characterized by having a greater concentration of total phosphor and/or large phosphor particles than does the initial charge slurry.

Since the binder (e.g., PVA), sensitizer (e.g., ammonium dichromate), and water slurry constituents apparently form a solution, it would seem that the ratio of these three constituents to each other should remain about the same in both the slurry dispensed into a faceplate panel and the slurry salvaged therefrom. Thus, in formulating the makeup slurry, it is desired to provide a formulation which has about the same binder to sensitizer to water ratio as did the initial slurry charge. A makeup slurry formulation having substantially the same binder to sensitizer to water ratio as does the initial slurry charge, provides a satisfactory, workable formulation.

However, I have further discovered that, for reasons not clearly understood, optimum screening results are obtained frequently if the ratio of binder to water is made slightly higher and the ratio of sensitizer to water slightly less in the makeup slurry than in the initial charge slurry. Such a makeup slurry formulation has proved to provide the optimum in producing an equilibrium of the reconstituted slurry in the dispensing apparatus insofar as maintaining constant the percentages of the various slurry constituents is concerned.

As an example of the practice of my invention, a mosaic dot phosphor screen may be made using as the red emitting phosphor silver activated zinc cadmium sulphide wherein the ratio by weight of zinc to cadmium is about 0.21:1 and which contains about 0.002% by weight of silver activator. This phosphor is the red emitting phosphor of the All-Sulfide Group P22 phosphors as registered with the Joint Electron Devices Engineering Council. It is sold commercially by the Radio Corporation of America and identified by them as 33-A-237A. In making mosaic dot screens with this phosphor, it has been determined that the initial phosphor slurry charge should preferably consist of approximately 17.9% phosphor, 4.0% PVA (A PVA/phosphor ratio of about 0.22), 0.4% ammonium dichromate, and 77.7% water by weight, and that the phosphor should have a particle size range of from 1 micron to 20 microns with 20–25% of the phosphor by weight comprising particles 10 microns or greater in size. As used herein, the size of a phosphor particle is designated as that which will settle at the same rate as a spherical particle having a diameter equal to the designated size.

In order to continuously obtain good adherence, I have discovered that the makeup slurry should preferably consist of approximately 22.0% phosphor, 4.2% PVA (a PVA/phosphor ratio of about 0.19), 0.36% ammonium dichromate, and 73.44% water by weight, and that the phosphor should have a particle size range of from 1 micron to 20 microns with 33–35% by weight of the phosphor comprising particles of 10 microns or greater.

Even though it is attempted to maintain the slurry constituent percentages constant in the dispensing apparatus, they nevertheless vary somewhat because of the continuing nature of the process by which the slurry is formulated. In actual commercial practice wherein the above noted initial charge and makeup slurry formulations are used, the observed formulation of the slurry in the dispensing apparatus as determined by periodic sampling thereof is as follows:

| | Minimum | Average | Maximum |
|---|---|---|---|
| Phosphor percentage | 15.35 | 17.77 | 19.82 |
| PVA percentage | 3.75 | 4.26 | 4.69 |
| PVA/phosphor ratio | 0.201 | 0.240 | 0.288 |

These percentages and ratios are the result of the desired equilibrium of slurry constituent percentages in dispensing apparatus.

A suitable method of practicing the invention involves the preparation of two batches of slurry which have different particle size characteristics and then blending these two batches in selected proportions to obtain a slurry having desired particle size characteristic intermediate that of the two batches. For the two slurry batches which are to be blended, their particle size characteristics are determined by standard centrifugal extraction and sedimentation techniques.

For example, one batch (designated Batch A) may have a PVA concentration of 4.5%, and a phosphor concentration of 25% with 40% of the phosphor being particles larger than 10 microns; the second batch (designated Batch B) may have a PVA concentration of 5.0% and a phosphor concentration of 29% with 16% of the phosphor being particles larger than 10 microns. A suitable initial slurry charge with 25% of the phosphor being particles larger than 10 microns can be obtained by blending 41 parts of Batch A and 59 parts of Batch B. A suitable makeup slurry with 35% of the phosphor being particles larger than 10 microns can be obtained by blending 81.5 parts of Batch A and 18.5 parts of Batch B. In each case, appropriate amounts of water, PVA, and/or ammonium dichromate are added to produce the desired formulations as, for example, described above.

In practice, the salvaged slurry may be processed in any one of several ways. By one practice, the salvaged slurry is mixed with makeup slurry to form a blended slurry which is then added to the initial slurry, either in the same dispenser or prior to placement in the same dispenser, to form the reconstituted slurry. By another practice, the salvaged slurry is returned directly to the same dispenser while makeup slurry is added to the same dispenser at the same time and mixed with the initial slurry to form the reconstituted slurry. By still another practice, the salvaged slurry is mixed with makeup slurry to form a reconstituted slurry, which is then used in a different dispenser with or without mixing with initial slurry. Thus, the reconstituted slurry may or may not include an amount of initial slurry. Procedural alternatives such as these provide more or less of blending of the constituent slurries, which reduces the variation in the physical properties of the reconstituted slurry. In every one of the alternatives, the reconstitued slurry is intended to approximate as closely as possible the properties of the initial slurry.

Each of the foregoing alternative procedures may be carried out on a continuous production basis or on a batch basis.

The invention may be applied to initial slurry formulations in which the phosphor concentrations are in the range of 13 to 30 weight percent of the slurry, the binder concentrations are in the range of 2.0 to 5.5 weight percent of the slurry, and the ratio of binder/-phosphor is in the range of 0.05 to 0.25.

The table gives some typical data for slurry formulations containing lower concentrations of PVA than those set forth above. In each case, the slurry contains an acrylic copolymer present in an amount equal to about 0.5 of the amount of PVA for the green and blue phosphor slurries, and 1.0 of the amount of PVA for the red phosphor slurry. The photosensitizer/binder ratio and the percentage of phosphor particles larger than 10 microns is the same in both the initial and in the makeup slurries for each example in the table. Also, in the table, the approximate molar formula of the blue phosphor is ZnS:Ag(0.015), of the green phosphor is $$0.69ZnS \cdot 0.31CdS:Ag(0.008)$$

and of the red phosphor is $Y_{0.95}Eu_{0.05}VO_4$.

TABLE

| Phosphor | Slurry | Wt. Percent Phosphor | Wt. Percent PVA | PVA/ Phosphor Ratio |
|---|---|---|---|---|
| Blue | Initial | 20.0 | 3.58 | 0.179 |
| | Makeup | 22.7 | 3.18 | 0.14 |
| Blue | Initial | 16.8 | 3.53 | 0.21 |
| | Makeup | 21.0 | 3.15 | 0.15 |
| Green | Initial | 21.7 | 2.52 | 0.116 |
| | Makeup | 28.4 | 2.27 | 0.08 |
| Green | Initial | 23.6 | 3.02 | 0.128 |
| | Makeup | 29.5 | 2.36 | 0.08 |
| Red | Initial | 19.1 | 2.98 | 0.156 |
| | Makeup | 19.3 | 2.70 | 0.14 |
| Red | Initial | 19.7 | 3.01 | 0.153 |
| | Makeup | 19.9 | 2.08 | 0.135 |

What is claimed is:

1. The method of making a plurality of phosphor screens comprising the steps of:

(a) applying a portion of initial slurry onto a first substrate, said initial slurry including phosphor particles predominantly in the size range of 1 to 20 microns with a minor weight proportion of said particles greater than 10 microns in size, said portion of initial slurry being more than that required to provide a coating of desired thickness on said first substrate.

(b) spreading said portion of initial slurry over said first substrate to said desired thickness, (c) removing from said first substrate the fraction of said portion of initial slurry which is in excess of that required to provide said coating of said desired thickness, (d) mixing said removed fraction with makeup slurry to produce a reconstituted slurry, said makeup slurry containing phosphor particles predominantly in the size range of 1 to 20 microns with a larger weight proportion of particles greater than 10 microns in size than the minor weight proportion in said initial slurry, (e) and then dispensing a portion of said reconstituted slurry onto a second substrate.

2. The method of making a plurality of phosphor screens comprising the steps of:

(a) applying a portion of initial slurry onto a first substrate, said initial slurry including phosphor particles predominantly in the size range of 1 to 20 microns with a minor weight proportion of said particles greater than 10 microns in size, binder, photosensitizer, and water, said portion of initial slurry being more than that required to provide a coating of desired thickness on said first substrate, (b) spreading said portion of initial slurry over said first substrate to said desired thickness, (c) removing from said first substrate the fraction of said portion of initial slurry which is in excess of that required to provide said coating of said desired thickness, (d) mixing said removed fraction with makeup slurry to produce a reconstituted slurry, said makeup slurry containing phosphor particles predominantly in the size range of 1 to 20 microns with a larger weight proportion of particles greater than 10 microns in size than the minor weight proportion in said initial slurry, said makeup slurry having a greater phosphor concentration, a greater binder/-water ratio, and a smaller photosensitizer/binder ratio than does said initial slurry.

(e) and then dispensing a portion of said reconstituted slurry onto a second substrate.

3. The method of claim 2 wherein said reconstituted slurry is comprised of said removed fraction, makeup slurry and initial slurry.

4. The method of making a plurality of phosphor screens comprising the steps of:

(a) applying a portion of initial slurry onto a first substrate, said initial slurry including phosphor particles predominantly in the size range of 1 to 20 microns with a minor weight proportion of said particles greater than 10 microns in size, binder, photosensitizer, and water, said portion of initial slurry being more than that required to provide a coating of desired thickness on said first substrate, (b) spreading said portion of initial slurry over said first substrate to said desired thickness, (c) removing from said first substrate the fraction of said portion of initial slurry which is in excess of that required to provide said coating of said desired thickness.

(d) preparing a reconstituted slurry comprised of said removed fraction and a makeup slurry, said makeup slurry containing phosphor particles predominantly in the size range of 1 to 20 microns with at least one of (1) a larger weight proportion of particles greater than 10 microns in size than the minor weight proportion in said initial slurry, (2) a greater phosphor concentration than in said initial slurry, (3) a greater binder/water ratio than in said initial slurry, (4) and a smaller photosensitizer/-binder ratio than in said initial slurry, (e) and then dispensing a portion of said reconstituted slurry onto a second substrate.

5. The method defined in claim 4 wherein said makeup slurry has a larger weight proportion of particles greater than 10 microns in size than the minor weight in said initial slurry.

6. The method defined in claim 4 wherein said makeup slurry has a greater phosphor concentration than in said initial slurry.

7. The method defined in claim 4 wherein said makeup slurry has a greater binder/water ratio than in said initial slurry.

8. The method defined in claim 4 wherein said makeup slurry has a smaller photosensitizer/binder ratio than in said initial slurry.

9. The method of making a plurality of phosphor screens comprising the steps of:

(a) applying a portion of initial slurry onto a first substrate, said initial slurry including phosphor particles predominantly in the size range of 1 to 20 microns, said portion of initial slurry being more than that required to provide a coating of desired thickness on said first substrate, (b) spinning said substrate to spread said portion of initial slurry over said first substrate to said desired thickness and to cause the fraction of said portion of initial slurry which is in excess of that required to provide said coating of said desired thickness to move toward the edges of said first substrate, (c) removing from said first substrate said excess fraction of initial slurry, (d) preparing a reconstituted slurry comprised of said removed fraction and a makeup slurry, said makeup slurry containing a greater concentration of phosphor particles predominantly in the size range of 1 to 20 microns than in said initial slurry, (e) and then dispensing a portion of said reconstituted slurry onto a second substrate.

10. The method of making a plurality of phosphor screens for cathode ray tubes comprising the steps of:

(a) applying a portion of initial slurry onto a dry surface of a first faceplate panel for a cathode ray tube, said initial slurry including phosphor particles predominantly in the size range of 1 to 20 microns and containing at least 13.0 weight percent phosphor, said portion of initial slurry being more than that required to provide a coating of desired thickness on said surface of said first substrate, (b) spinning said substrate to spread said portion of initial slurry over the surface of said first substrate to said desired thickness, and to cause the fraction of said portion of initial slurry which is in excess of that required to provide said coating of said desired thickness to move toward the edges of the surface of said first substrate, (c) removing said excess fraction of initial slurry from said first substrate, (d) mixing said removed fraction with makeup slurry and initial slurry to produce a reconstituted slurry, said makeup slurry containing phosphor particles predominantly in the size range of 1 to 20 microns with a greater weight percent of phosphor than in said initial slurry, (e) and then dispensing a portion of said reconstituted slurry onto a second faceplate panel for a cathode ray tube.

* * * * *